(12) United States Patent
John (10) Patent No.: US 11,409,513 B2
(45) Date of Patent: Aug. 9, 2022

(54) SURROGATE VEHICLE OTA UPDATE THROUGH V2X

(71) Applicant: Ford Global Technologies, LLC, Dearborn, MI (US)

(72) Inventor: Jerry John, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 16/744,624

(22) Filed: Jan. 16, 2020

(65) Prior Publication Data

US 2021/0224056 A1    Jul. 22, 2021

(51) Int. Cl.
| | |
|---|---|
| *G06F 8/65* | (2018.01) |
| *H04W 4/44* | (2018.01) |
| *H04W 4/46* | (2018.01) |
| *B60W 50/00* | (2006.01) |
| *H04L 67/00* | (2022.01) |
| *G05D 1/02* | (2020.01) |

(52) U.S. Cl.
CPC .............. *G06F 8/65* (2013.01); *B60W 50/00* (2013.01); *H04L 67/34* (2013.01); *H04W 4/44* (2018.02); *H04W 4/46* (2018.02); *B60W 2050/0075* (2013.01); *B60W 2050/0083* (2013.01); *B60W 2556/45* (2020.02); *G05D 1/0276* (2013.01)

(58) Field of Classification Search
CPC . G06F 8/65; B60W 50/00; B60W 2050/0075; B60W 2050/0083; B60W 2556/45; B60W 2754/30; B60W 2756/10; B60W 60/0025; H04L 67/34; H04L 67/12; H04W 4/44; H04W 4/46; H04W 4/02; G05D 1/0276; G08G 1/00
See application file for complete search history.

(56) References Cited

U.S. PATENT DOCUMENTS

| | | | |
|---|---|---|---|
| 10,220,850 B2 * | 3/2019 | Naserian ............ | G06K 9/00791 |
| 2012/0108163 A1 | 5/2012 | Bai et al. | |
| 2015/0220321 A1 * | 8/2015 | Jung .................. | G06F 8/65 |
| | | | 717/169 |
| 2019/0050217 A1 * | 2/2019 | Tatourian ............ | H04W 12/10 |
| 2019/0205115 A1 * | 7/2019 | Gomes ............... | H04W 4/50 |
| 2019/0349552 A1 * | 11/2019 | Kurihashi ........... | H04W 4/44 |
| 2019/0380014 A1 * | 12/2019 | Onishi ............ | G08G 1/096791 |
| 2020/0125354 A1 * | 4/2020 | Kim .................. | G06F 8/65 |
| 2020/0348924 A1 * | 11/2020 | Park .................. | G06F 21/57 |

FOREIGN PATENT DOCUMENTS

WO    WO2018077168 A1    5/2018

\* cited by examiner

*Primary Examiner* — Daxin Wu (74) *Attorney, Agent, or Firm* — Michael Spenner; Brooks Kushman P.C.

(57) ABSTRACT

A first vehicle includes a wireless transceiver; and a processor programmed to responsive to encountering a second vehicle, establish a wireless connection to the second vehicle via the wireless transceiver and obtain a vehicle identification of the second vehicle, identify a software update for a controller of the second vehicle using the vehicle identification, wherein the software update is incompatible with the vehicle, responsive to connecting to a predefined wireless network, download the software update into a local storage, and responsive to reencountering the second vehicle, reconnect to the second vehicle via the wireless transceiver and transmit the software update to the second vehicle.

19 Claims, 4 Drawing Sheets

SURROGATE VEHICLE OTA UPDATE THROUGH V2X

TECHNICAL FIELD

The present disclosure generally relates to a vehicle software update system. More specifically, the present disclosure relates to a system for updating vehicle software via vehicle-to-everything (V2X) and vehicle-to-vehicle (V2V) connections.

BACKGROUND

Modern vehicles are equipped with a number of electronic control units (ECUs) that are driven by software. Updating the software to fix bugs or to roll out new features is a useful part of product delivery and customer service. Over the air (OTA) updates are one way to deliver these changes directly to the vehicle without the need to go to an authorized dealer. However, software update data is increasing in size and may be costly if delivered via a paid network such as a cellular network.

SUMMARY

In one or more illustrative embodiments of the present disclosure, a first vehicle includes a wireless transceiver; and a processor programmed to responsive to encountering a second vehicle, establish a wireless connection to the second vehicle via the wireless transceiver and obtain a vehicle identification of the second vehicle, identify a software update for a controller of the second vehicle using the vehicle identification, wherein the software update is incompatible with the vehicle, responsive to connecting to a predefined wireless network, download the software update into a local storage, and responsive to reencountering the second vehicle, reconnect to the second vehicle via the wireless transceiver and transmit the software update to the second vehicle.

In one or more illustrative embodiments of the present disclosure, a method for a vehicle operating as a donor vehicle includes responsive to encountering a recipient vehicle, establishing a wireless connection to the recipient vehicle via a wireless transceiver, obtaining a vehicle identification of the recipient vehicle, and updating a frequency list to record encounter information of the recipient vehicle, wherein the encounter information includes location, time and duration of the encounter; identifying a software update for a controller of the recipient vehicle using the vehicle identification, wherein the software update is incompatible with any controller of the donor vehicle; calculating a probability to reencounter the recipient vehicle using the frequency list; responsive to the probability being greater than a predefined threshold, downloading the software update into a local storage; and responsive to reencountering the recipient vehicle, reestablishing the wireless connection and transmitting the software to the recipient vehicle via the wireless connection.

In one or more illustrative embodiments of the present disclosure, a non-transitory computer-readable medium, includes instructions, when executed by a processor of a vehicle, made the vehicle to responsive to encountering a recipient vehicle, establish a wireless connection to the recipient vehicle via a wireless transceiver, obtain a current software version for a controller of the recipient vehicle, and update a frequency list to record encounter information of the recipient vehicle, wherein the encounter information includes location, time and duration of the encounter; identify a software update for a controller of the recipient vehicle using the current software version; calculate a probability to reencounter the recipient vehicle using the frequency list; responsive to the probability being greater than a predefined threshold and the vehicle connecting to a predefined network, download the software update into a local storage; and responsive to reencountering the recipient vehicle, reestablish the wireless connection and transmit the software to the recipient vehicle via the wireless connection.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a surrogate vehicle system for sharing data between vehicles.

More specifically, the present disclosure proposes a vehicle system for sharing vehicle software update data between different vehicle models via V2V/V2X connections.

Within an automaker's portfolio, there may be premium models provided with higher vehicle specifications (e.g. memory storage, wireless connectivity technologies or the like). Additionally, some vehicles may have better access to the Internet due to their usage and location (e.g. the parking location is covered by a free-of-charge Wi-Fi). These vehicles in general may be in a better position to serve as donor vehicles (a.k.a. privileged vehicles) configured to download update data to share with other vehicles. The vehicles on the receiving end of the surrogate system may be referred to as recipient vehicles (a.k.a. beneficiary vehicles). For instance, a donor vehicle and a recipient vehicle may take (at least partially) the same route at substantially the same time five days a week. During the daily commute, the vehicles may learn the presence within a predefined distance of each other via a wireless connection. In this case, the donor vehicle, as a surrogate, may have access to free/low cost data and may download the OTA update data for the recipient vehicle. The next time the two vehicles encounter one another on the same route (e.g. both stuck on the freeway traffic), the update data may be transmitted from the donor vehicle to the recipient vehicle. The donor vehicle may receive rewards for its activities in offering help to other vehicles.

Figure 1:
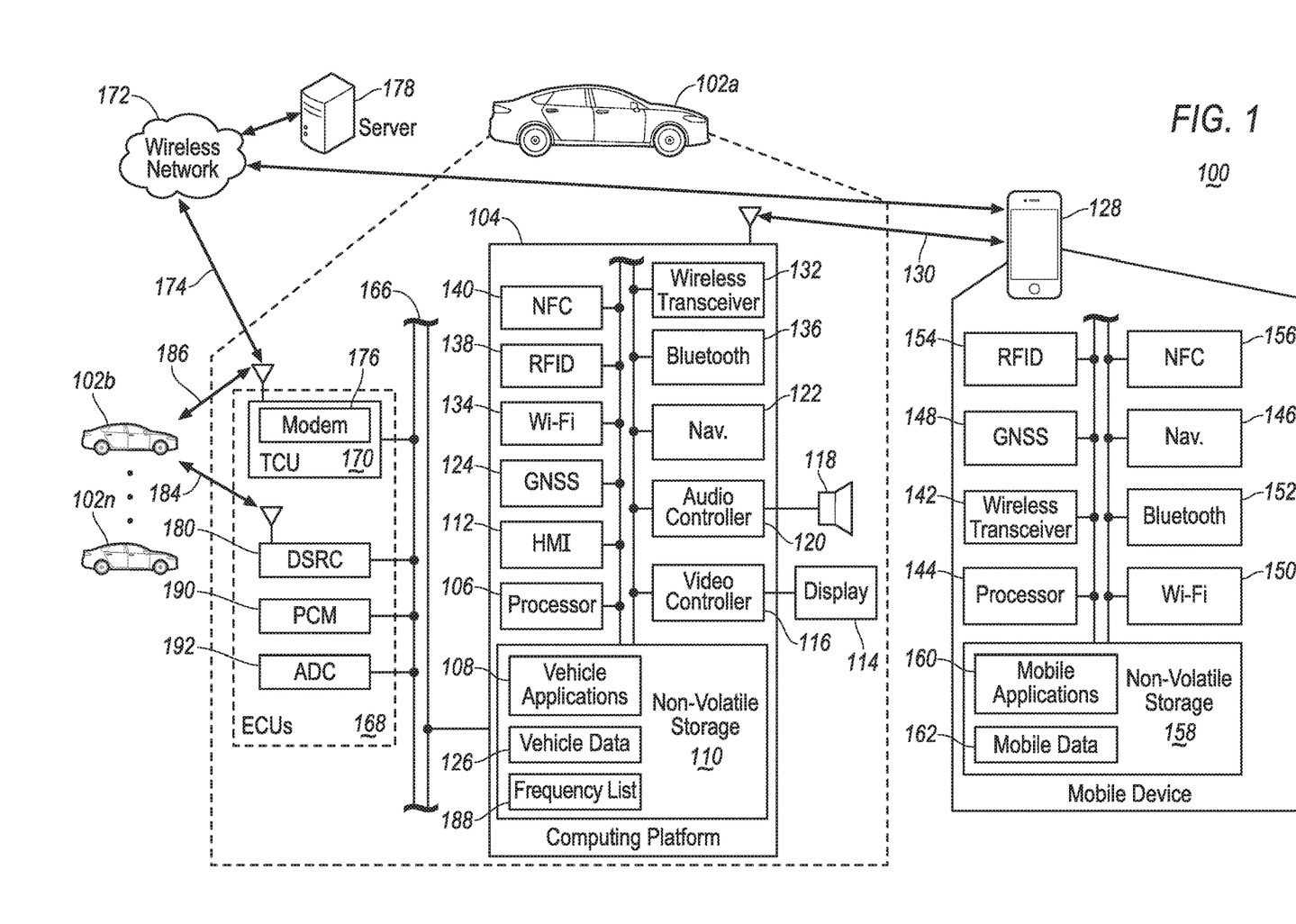
FIG. 1 illustrates an example block topology of a surrogate vehicle system of one embodiment of the present disclosure.

Referring to FIG. 1, an example block topology of a vehicle system 100 of one embodiment of the present disclosure is illustrated. A vehicle 102a may include various types of automobile, crossover utility vehicle (CUV), sport utility vehicle (SUV), truck, recreational vehicle (RV), boat, plane, or other mobile machine for transporting people or goods. In many cases, the vehicle 102a may be powered by an internal combustion engine. As another possibility, the vehicle 102a may be a battery electric vehicle (BEV), or a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, data analysis, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102a. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102a. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, an ultra-wide band (UWB) transceiver (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102a via one or more in-vehicle network 166. The in-vehicle network 166 may include, but is not limited to, one or more of a controller area network (CAN), an Ethernet network, and a media-oriented system transport (MOST), as some examples.

The computing platform 104 may be configured to communicate with various ECUs 168 of the vehicle 102a configured to perform various operations. For instance, the computing platform may be configured to communicate with a TCU 170 configured to control telecommunication between vehicle 102a and a wireless network 172 through a wireless connection 174 using a modem 176. The wireless connection 174 may be in the form of various communication network e.g. a cellular network. Through the wireless network 172, the vehicle may access one or more servers 178 to access various content for various purposes. It is noted that the terms wireless network and server are used as general terms in the present disclosure and may include any computing network involving carriers, router, computers, controllers or the like configured to store data and perform data processing functions and facilitate communication between various entities.

The ECUs 168 may further include a DSRC controller 180 configured to communicate with one or more fleet vehicles 102b . . . 102n via a wireless V2V or V2X connection. For instance, the DSRC controller 180 may be configured to communicate with one or more fleet vehicles 102b . . . 102n via a DSRC connection 184. The fleet vehicles 102b . . . 102n may include various vehicles associated with the same or different manufacturers and subscribed to the data sharing feature enabled by the vehicles system of the present disclosure. In the present example, the fleet vehicles 102b . . . 102n are subscribed to the surrogate software update sharing feature of the present disclosure. Additionally or alternatively, the vehicle 102a may communicate with the fleet vehicles 102b . . . 102n via a cellular vehicle-to-everything (CV2X) connection 186 through the TCU 170. For instance, responsive to detecting each other, the fleet vehicles 102 may establish one or more wireless connections 184 and 186 and exchange basic information such as vehicle identification, ECU software version number and availability of software update in the storage of each vehicle. The vehicle 102a may be configured to form and maintain a frequency list 188 to record the encounter of fleet vehicles (to be discussed in detail below). The ECUs 168 may further include a powertrain control module (PCM) 190 configured to perform various control and operations of the powertrain of the vehicle 102a. The ECUs 168 may further include an autonomous driving controller (ADC) 192 configured to provide autonomous driving features to the vehicle 102a. It is noted that the ECUs 168 introduced here are merely examples and the actual vehicle 102a may be provided with more ECUs or controllers configured to perform various operations. Each ECU 168 may be provided with processing and storage capabilities operated by computer software. Update data for the computer software may be obtained from the server 178 over the wireless network 172. Additionally or alternatively, as discussed herein, the software update data may be shared across the fleet vehicles 102.

Figure 2:
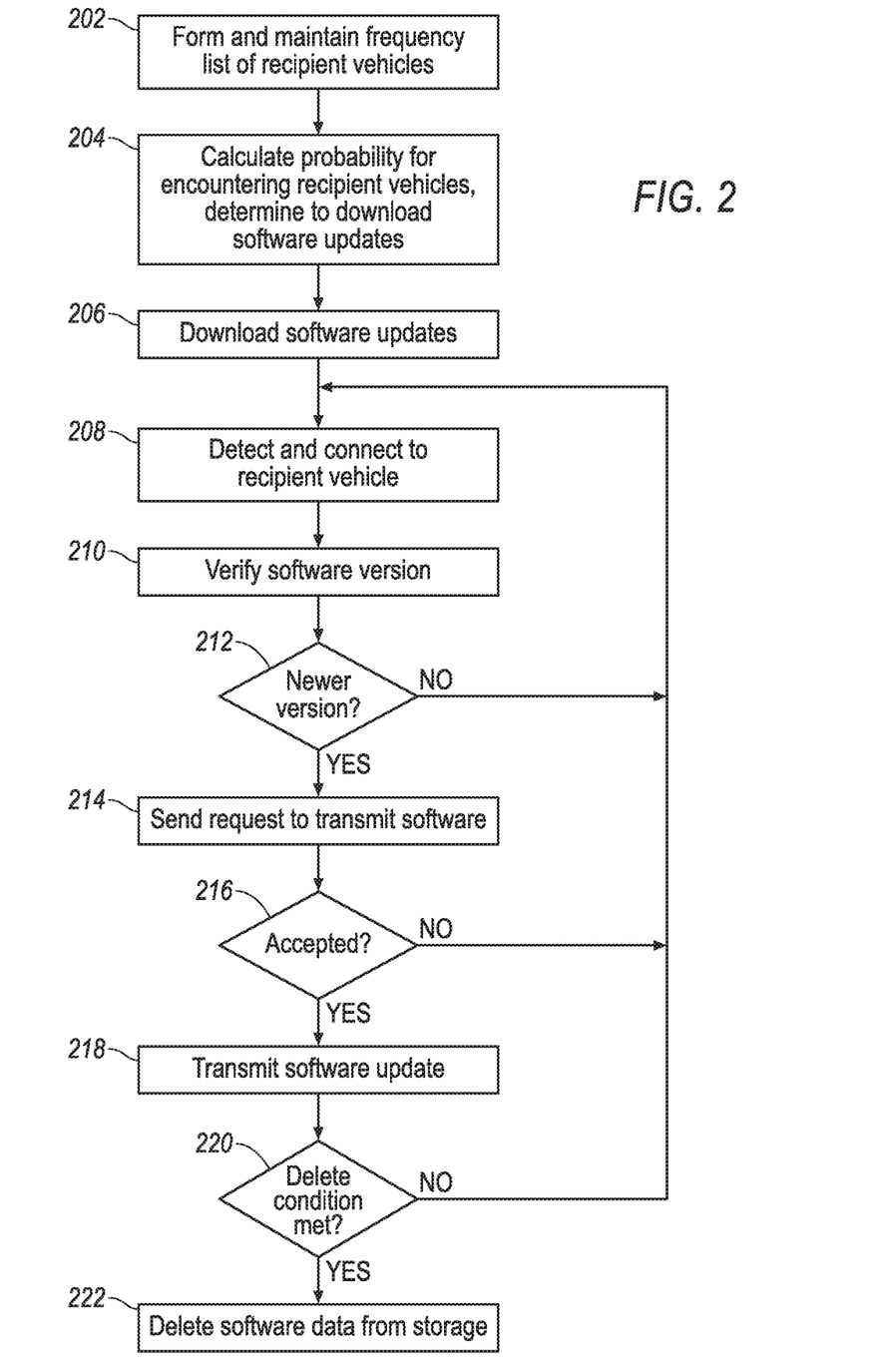
FIG. 2 illustrates an example flow diagram for a process of the surrogate vehicle system of one embodiment of the present disclosure.

Referring to FIG. 2, an example flow diagram for a process 200 of the surrogate vehicle system of one embodiment of the present disclosure is illustrated. With continuing reference to FIG. 1, the vehicle 102a operates as a donor vehicle in the present example. At operation 202, the donor vehicle 102a forms and maintains the frequency list 188 of recipient vehicles that have been wirelessly detected by the donor vehicle 102a during a predefined period of time (e.g. during the past week). Each time the donor vehicle 102a detects a compatible fleet vehicle having the recipient feature enabled, the donor vehicle 102a record the time, location and identity (e.g. VIN number) of the recipient vehicle in the frequency list 188. Additionally, the donor vehicle may further obtain software version of one or more ECUs/controllers of the recipient vehicle to facilitate the identification of software updates to download. The frequency list 188 of recipient vehicles may be maintained in the storage 110 of the donor vehicle 102a. Additionally or alternatively, the frequency list 188 may be stored in the storage of the mobile device 128 associated with the donor vehicle 102a or in the cloud server 178. In case the user of the donor 102a operates multiple vehicles, the frequency list 188 may be shared across the multiple vehicles operated by the user to maximize the benefit of the data sharing operation. At operation 204, the donor vehicle 102a calculates the probability of encountering each recipient vehicles on the frequency list 188 to determine what update software data to download due to the limited storage space and wireless connectivity. In generally, the vehicle 102a may prioritize recipient vehicles having a higher probability to encounter again based on prior detection frequency. For instance, if the donor vehicle 102a determines it is likely to encounter a recipient vehicle 102b again in the near future, the donor vehicle 102a may download software update for recipient vehicle 102b as a surrogate, and transmit the software update that has already been downloaded to the recipient vehicle 102b during the next encounter. Upon identifying the recipient vehicle, the donor vehicle 102a may still need to determine the correct version of the correct ECU for the recipient vehicle to update. There are multiple mechanisms to facilitate the donor vehicle 102a to make such as determination. For instance, the donor vehicle 102a may send the identification (e.g. VIN) of the recipient vehicle to the server 178 to identify the latest version number of the ECU of the recipient vehicle to be updated. The server 178 may maintain a database which reflects ECU/controller software versions of each fleet vehicle 102. Alternatively, in case that the frequency list 188 includes software versions of the ECU of the recipient vehicle, the donor vehicle 102a may verify the software version recorded in the frequency list 188 via the server 178 to determine the availability of any newer version of software. Responsive to determining the correct versions, the donor vehicle 102a downloads the software updates at operation 206. The donor vehicle 102a may be configured to only download the software updates upon a predefined condition is met. For instance, the donor vehicle 102a may be configured to only download the data via a free-of-charge network (e.g. a home Wi-Fi) at a predefined location. To avoid network traffic congestions, the donor vehicle 102a may be further configured to only download the data at a specific time frame (e.g. 1 AM to 6 AM) to avoid rush hour data traffic. The configurations may be performed by a user via the HMI controls 112 of the computing platform 104, and/or received from the mobile device 128 or the server 178.

At operation 208, responsive to detecting a recipient vehicle while operating on a route, the donor vehicle 102a wirelessly connects with the recipient vehicle. The recipient vehicle may be a vehicle previously detected by the donor vehicle 102a and already in the frequency list 188. Alternatively, the recipient vehicle to which the donor vehicle 102a connects at operation 208 may further include a new recipient vehicle supporting the surrogate software update feature. Responsive to connecting to the recipient vehicle, at operation 210, the donor vehicle 102a verifies a software version of one or more ECUs of the recipient vehicle. For instance, the donor vehicle 102a may send a message to inform the recipient vehicle about one or more available software updates that have been successfully downloaded and stored in storage 110, and wait for a response from the recipient vehicle to indicate if the update is newer than the current version of software. At operation 212, if the donor vehicle 102a determines the downloaded software is not newer than the current version of ECU software of the recipient vehicle, the process returns to operation 208. Otherwise, the process proceeds to operation 214 and the donor vehicle 102 request to transmit the software update data to the recipient vehicle. The recipient vehicle may choose to accept or decline the transmission request autonomously or based on human input. If the recipient vehicle chooses to decline the transmission request or fails to accept the request with in a predetermined period of time, the process returns to operation 208. Otherwise, the process proceeds to operation 218 and the donor vehicle 102a starts to transmit the software update data via the wireless connection 184, 186.

Since the storage capacity of the donor vehicle 102a is limited, the donor vehicle 102a may be configured to delete the software update data upon predefined conditions are met. For instance, the predefined condition to delete may include a predefined period of time since the update data has been downloaded. Additionally, the predefined condition may further include successful transmission of the update data to one or more recipient vehicle performed at operation 218. Responsive to verifying the condition to delete has been met at operation 220, the process proceeds to operation 222 and delete the software update data from the storage 110.

Figure 3A:
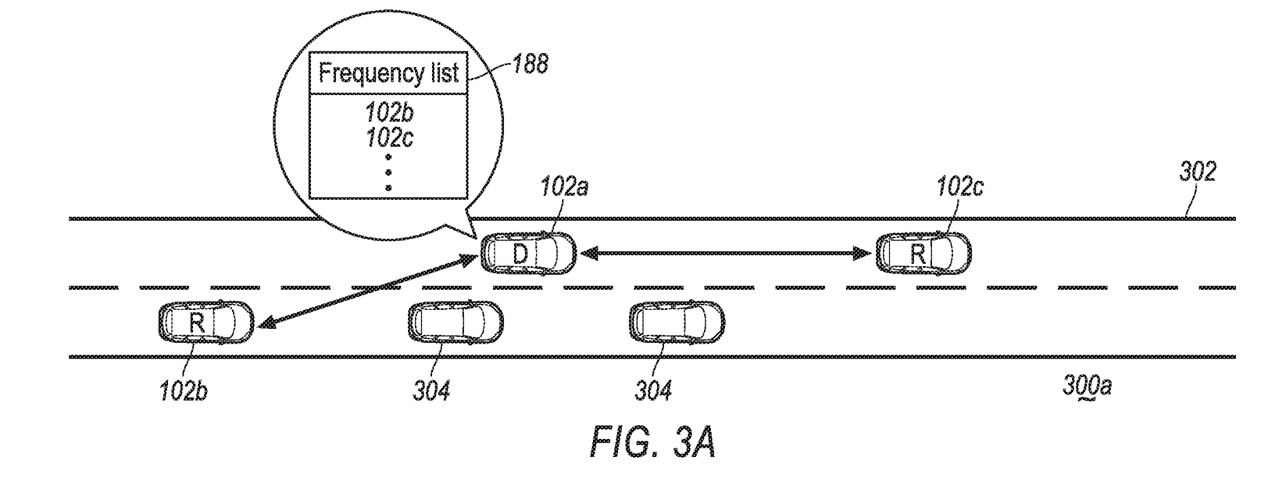
FIGS. 3A and 3B illustrate example schematic diagrams for the surrogate vehicle system of one embodiment of the present disclosure.
Figure 3B:
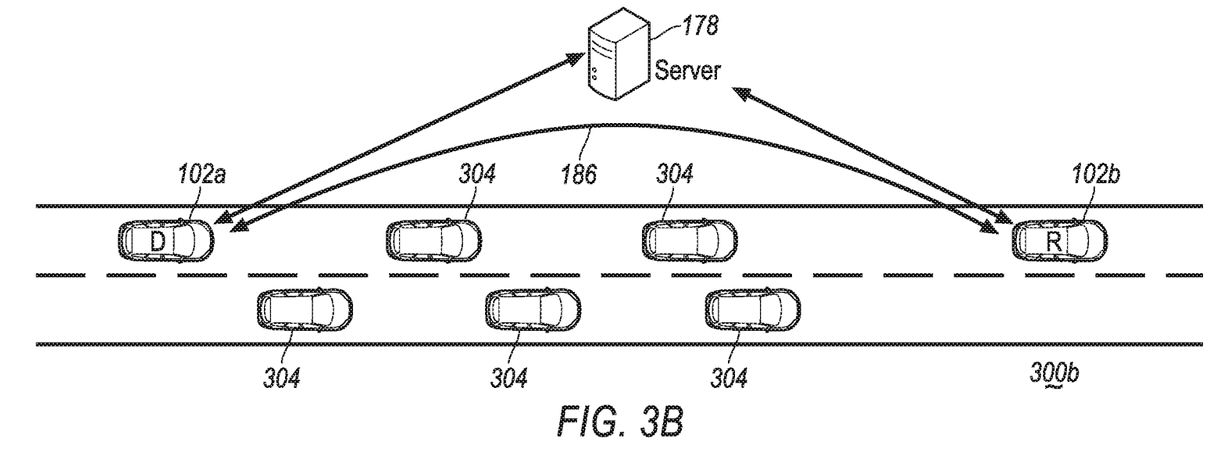

The operations of process 200 may be applied to various situations. Referring to FIGS. 3A and 3B, example schematic diagrams 300 of the surrogate vehicle system of one embodiment of the present disclosure are illustrated. With continuing reference to FIGS. 1 and 2, the vehicle 102a may be provided with the surrogate software update feature enabled by the present disclosure. In the present example, the vehicle 102a may be configured to operates as a donor vehicle. It is noted that the position of donor vehicle and recipient vehicle may not be mutually exclusive. One vehicle operates as a donor vehicle may as well operates as a recipient vehicle at the same time. The surrogate software update system by default may be generally configured to enable the recipient vehicle feature, but disable the donor feature of each compatible fleet vehicle. A user or operator may manually enable the donor feature of the vehicle 102a. As the donor vehicle 102a operates on a route 302, one or more fleet vehicles operating as recipients within the wireless transmission range of the donor vehicle 102a may be detected. In the present example, fleet vehicles 102b and 102c may be detected by the donor vehicle 102a. In response, the donor vehicle 102a may record the information of the fleet vehicles 102b and 102c into the frequency list. Other vehicles 304 traversing the same route 302 may be incompatible with the surrogate update feature and therefore ignored by the donor vehicle 102a. Over time, the donor vehicle 102a may reencounter the same recipient vehicles 102b and 102c and download update data for these two vehicles for their high probability of reencountering.

Referring to FIG. 3B, as the donor vehicle 102a and the recipient vehicle 102b reencounter, a V2V wireless connection 186 may be established. In one example, the donor vehicle 102a and the recipient vehicle 102b may travel spontaneously without coordination. Alternatively, fleet vehicles 102 of the surrogate vehicle system may be coordinated by the server 178 to travel together without the V2V transmission range. For instance, responsive to detecting donor vehicle 102a and the recipient vehicle 102b are generally travelling on the same direct but the distance between the two vehicles are beyond the transmission range, the server 178 may send driving instructions to one or more of the two vehicles to direct the vehicles to get closer. The server 178 may send driving instructions to the donor vehicle 102a which is ahead of the recipient vehicle 102b to slow down, and send driving instruction to the recipient vehicle 102b to speed up so the two vehicles can get closer. The server 178 may further send driving instructions to the recipient vehicle 102b to change the current route to accommodate the donor vehicle 102a to facilitate the V2V transmission. Responsive to receiving the driving instructions, the donor vehicle 102a may output the instructions via the HMI controls 112 to suggest the driver to take actions. Alternatively, in case that the donor vehicle 102a is provided with autonomous driving features, the ADC 192 may autonomously follow the instructions from the server 178 to perform the autonomous driving. Responsive to establishing the wireless connection 186 and verifying the software versions, the donor vehicle 102a may start to transmit the software update data to the recipient vehicle 102b.

Figure 4:
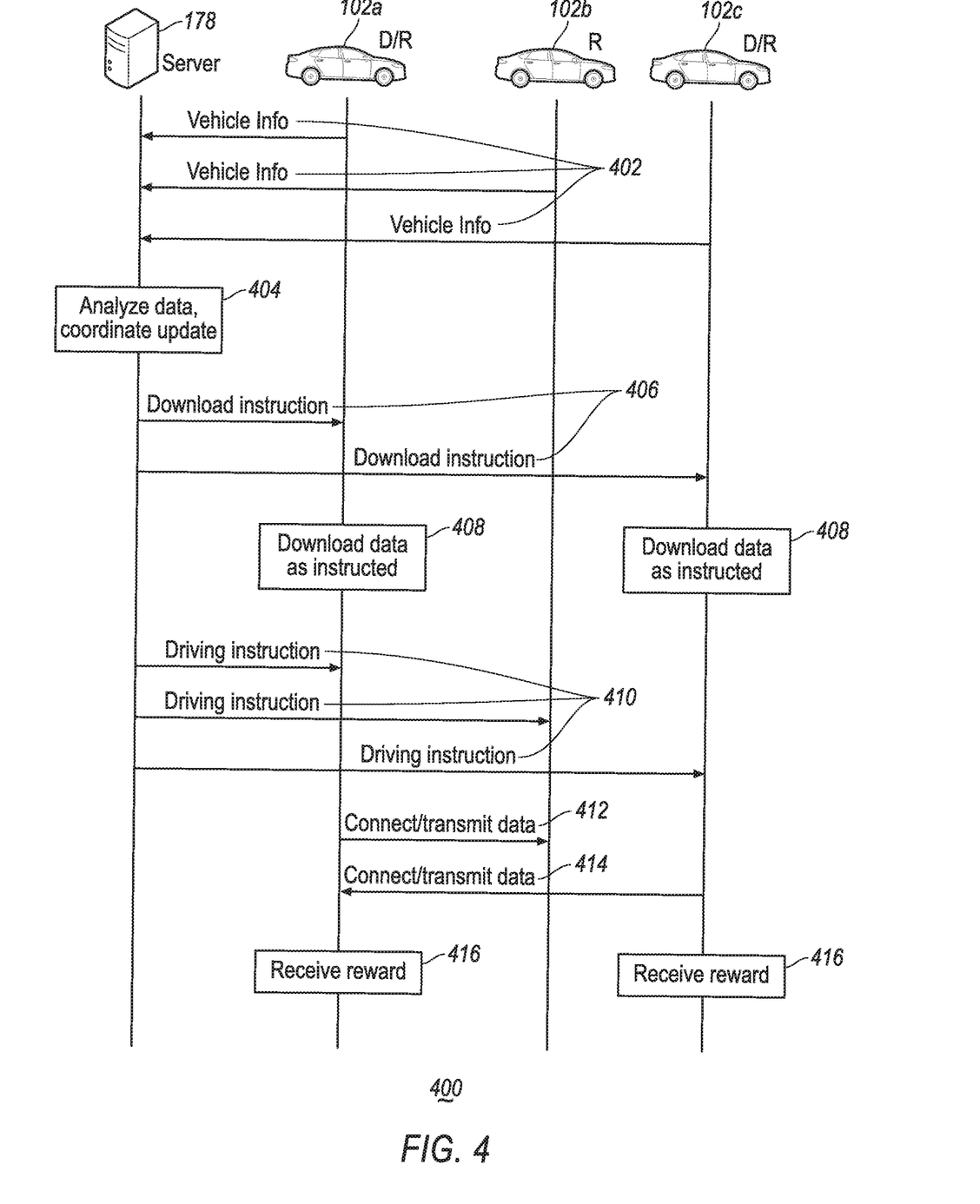
FIG. 4 illustrates and example data flow diagram for the surrogate vehicle system of another embodiment of the present disclosure.

Referring to FIG. 4, an example data flow diagram for the surrogate software upgrade system of another embodiment of the present disclosure is illustrated. With continuing reference to FIGS. 1-3, three fleet vehicles 102a, 102b and 102c are involved in the surrogate vehicle update process in the present example. Among the three vehicles, the first vehicle 102a and third vehicle 102c operate as both a donor and recipient vehicle, whereas the second vehicle 102b operates only as a recipient vehicle with the donor feature deactivated. Additionally, operation of the fleet vehicles 102 are coordinated through the server 178 in the present example. At operation 402, all three fleet vehicles report vehicle information to the server for analysis. The vehicle information may include vehicle model, identification, ECU/controller software version, available storage capacity, as well as travel history of each vehicle for instance in facilitation of the server 178 to coordinate the update process. The vehicle information may further include wireless network connection history of each vehicle to allow the server 178 to determine an appropriate portion/size of data to download. In the present example, the three vehicles 102 may share some common locations (e.g. located within close neighborhoods and/or overlapping common commute route). The server 178 may determines such a commonality between the three fleet vehicles 102 by analyzing the vehicle information at operation 404. With the commonality determined, the server 178 may proceed to assign a download mission to each of the donor vehicle 102a and 102c using the ECUs version information received from each vehicle. At operation 406, the server 178 sends download instructions identifying software update for downloading to each of donor vehicles 102a and 102c. For instance, the server 178 may instruct the first vehicle 102a to download a portion of all available update and instruct the third vehicle 102c to download another portion to more distribute the burden. The server 178 may be further configured to use the wireless connection history of the donor vehicles to determine an appropriate size of data corresponding to the specific connection accessibility of each vehicle. Additionally, the download instructions may further be indicative of the identity of potential recipient vehicle (e.g. the second vehicle 102b) for the software update. Responsive to receiving the download instructions, at operation 408, the donor vehicles 102a and 102c may individually download the software update package data as instructed.

To further coordinate the surrogate vehicle software update process, the server 178 may further send driving instructions to each of the fleet vehicles 102 to direct the vehicle 102 to get closer at operation 410. For instance, responsive to detecting two or more fleet vehicles 102 have started traveling, the server 178 may instruct the fleet vehicles 102 to drive closer to facilitate the establishment of a wireless V2V connection 186. As discussed above, the vehicles may output the driving instructions via the HMI controls 112, or alternatively autonomously perform maneuvers based on the instructions if the autonomous driving feature is provided. As the fleet vehicles 102 drives toward one another and enters the wireless transmission range, the vehicles 102 may connect to each other and start to transmit the data as discussed in detail with reference to FIG. 2. In the present example, at operation 412, the first vehicle 102a as a donor vehicle, may connect and transmit software update data to the second vehicle 102b as a recipient vehicle. At operation 401, the first vehicle may receive another piece of software update as a recipient vehicle from the third vehicle 102c. Responsive to a successful transmission, the donor vehicles 102a and 102c may receive a reward from the server 178 for their sharing activity. The reward may be in various forms such as vehicle dealer service credit, coupon, digital currency or the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A first vehicle, comprising:
   a wireless transceiver; and
   a processor programmed to
   responsive to encountering a second vehicle, update a frequency list maintained and establish a wireless connection to the second vehicle via the wireless transceiver and obtain a vehicle identification of the second vehicle,
   identify a software update for a controller of the second vehicle using the vehicle identification, wherein the software update is incompatible with the first vehicle,
   calculate a probability to encounter the second vehicle using the updated frequency list,
   responsive to the probability being greater than a predefined threshold and responsive to connecting to a predefined wireless network, download the software update into a local storage, and
   responsive to reencountering the second vehicle, reconnect to the second vehicle via the wireless transceiver and transmit the software update to the second vehicle.

2. The first vehicle of claim 1, wherein the processor is further programmed to:
   responsive to receiving a driving instruction directing the first vehicle to get closer to the second vehicle, perform a driving maneuver using the driving instruction.

3. The first vehicle of claim 1, wherein the processor is further programmed to:
   maintain the frequency list recording encounter information each time the vehicle encounters the second vehicle, wherein the encounter information includes location, time and duration of encounters.

4. The first vehicle of claim 1, wherein the processor is further programmed to:
   sharing the frequency list with another vehicle associated with a user of the vehicle.

5. The first vehicle of claim 1, wherein the processor is further programmed to:
   responsive to reconnecting to the second vehicle, verify a current software version for the controller of the second vehicle.

6. The first vehicle of claim 5, wherein the processor is further programmed to:
   responsive to verifying the software update is of a newer version, send a request to transmit software to the second vehicle; and
   responsive to receiving an acceptance of the request, transmit the software update to the second vehicle.

7. The first vehicle of claim 1, wherein the processor is further programmed to:
   responsive to receiving a download instruction from a server, download the software update for the second vehicle, wherein the download instruction include information identifying a version of the software update to download and the second vehicle as a potential recipient vehicle.

8. The first vehicle of claim 1, wherein the processor is further programmed to:
   responsive to connecting to a third vehicle for the first time, verify if the software update is compatible with a controller of the third vehicle; and
   responsive to verifying the software is compatible with the controller of the third vehicle, wirelessly transmit the software update to the third vehicle.

9. The first vehicle of claim 1, wherein the processor is further programmed to:
   responsive to connecting a fourth vehicle which indicates an availability of a second software update, verify if the second software update is compatible and newer than a current version of software for a controller of the vehicle; and
   responsive to a successful verification, send an accept message indicative intent to receive to second software update to the fourth vehicle.

10. A method for a vehicle operating as a donor vehicle, comprising:
    responsive to encountering a recipient vehicle,
       establishing a wireless connection to the recipient vehicle via a wireless transceiver,
       obtaining a vehicle identification of the recipient vehicle, and
       updating a frequency list to record encounter information of the recipient vehicle, wherein the encounter information includes location, time and duration of the encounter;
    identifying a software update for a controller of the recipient vehicle using the vehicle identification, wherein the software update is incompatible with any controller of the donor vehicle;

calculating a probability to reencounter the recipient vehicle using the frequency list;

responsive to the probability being greater than a predefined threshold and to connecting to a predefined network, downloading the software update into a local storage; and responsive to reencountering the recipient vehicle, reestablishing the wireless connection and transmitting the software to the recipient vehicle via the wireless connection.

11. The method of claim 10, further comprising:

responsive to receiving a driving instruction directing the donor vehicle to get closer to the recipient vehicle, performing a driving maneuver using the driving instruction.

12. The method of claim 10, further comprising:

responsive to receiving a download instruction from a server, downloading the software update for the recipient vehicle, wherein the download instruction include information identifying a version of the software update to download and an identity of the recipient vehicle.

13. The method of claim 10, further comprising:

sharing the frequency list with another vehicle associated with a user of the donor vehicle.

14. The method of claim 10, further comprising:

responsive to reestablishing the wireless connection with the recipient vehicle, verifying a current software version for the controller of the recipient vehicle; and responsive to verifying the software update is of a newer version, starts to transmit the software update to the recipient vehicle.

15. A non-transitory computer-readable medium, comprising instructions, when executed by a processor of a vehicle, made the vehicle to:

responsive to encountering a recipient vehicle,
establish a wireless connection to the recipient vehicle via a wireless transceiver,
obtain a current software version for a controller of the recipient vehicle, and
update a frequency list to record encounter information of the recipient vehicle, wherein the encounter information includes location, time and duration of the encounter;
identify a software update for a controller of the recipient vehicle using the current software version;
calculate a probability to reencounter the recipient vehicle using the frequency list;

responsive to the probability being greater than a predefined threshold and the vehicle connecting to a predefined network, download the software update into a local storage, wherein the software update is incompatible with any controller of the vehicle; and responsive to reencountering the recipient vehicle, reestablish the wireless connection and transmit the software to the recipient vehicle via the wireless connection.

16. The non-transitory computer-readable medium of claim 15, further comprising instructions, when executed by a processor of a vehicle, made the vehicle to:

responsive to receiving a driving instruction directing the vehicle to get closer to the recipient vehicle, perform a driving maneuver using the driving instruction.

17. The non-transitory computer-readable medium of claim 16, further comprising instructions, when executed by a processor of a vehicle, made the vehicle to:

responsive to receiving a download instruction from a server, download the software update for the recipient vehicle, wherein the download instruction include information identifying the version of the software update to download and an identity of the recipient vehicle.

18. The non-transitory computer-readable medium of claim 15, further comprising instructions, when executed by a processor of a vehicle, made the vehicle to:

responsive to connecting to a second recipient vehicle for the first time, verify if the software update is compatible with a controller of the second recipient vehicle; and responsive to verifying the software is compatible with the controller of the second recipient vehicle, wirelessly transmit the software update to the second recipient vehicle.

19. The non-transitory computer-readable medium of claim 15, further comprising instructions, when executed by a processor of a vehicle, made the vehicle to:

responsive to connecting a donor vehicle which indicates an availability of a second software update, verify if the second software update is compatible and newer than a current version of software for a controller of the vehicle; and responsive to a successful verification, send an accept message indicative intent to receive to second software update to the donor vehicle.

* * * * *